United States Patent
Fiorenzi et al.

(10) Patent No.: US 7,383,783 B2
(45) Date of Patent: Jun. 10, 2008

(54) APPARATUS AND METHOD TO MAKE A SAIL AND RELATIVE SAIL MADE

(75) Inventors: Alberto Fiorenzi, Bia Gomero, 41, Osimo (IT) 60027; Gian Mauro Maneia, Lessona (IT)

(73) Assignee: Alberto Fiorenzi, Osimo (An) (IT)

( * ) Notice: Subject to any disclaimer, the term of this patent is extended or adjusted under 35 U.S.C. 154(b) by 0 days.

(21) Appl. No.: 11/662,241

(22) PCT Filed: Apr. 22, 2005

(86) PCT No.: PCT/EP2005/051813

§ 371 (c)(1),
(2), (4) Date: Mar. 8, 2007

(87) PCT Pub. No.: WO2005/061321

PCT Pub. Date: Jul. 7, 2005

(65) Prior Publication Data

US 2007/0256621 A1    Nov. 8, 2007

(30) Foreign Application Priority Data

Sep. 9, 2004    (IT) ................ UD2004A0175

(51) Int. Cl.
*B63H 9/04*    (2006.01)
(52) U.S. Cl. .............. 114/102.29; 114/102.33
(58) Field of Classification Search ............ 114/102.1, 114/102.29, 102.31, 102.33; 428/109, 110, 428/113
See application file for complete search history.

(56) References Cited

U.S. PATENT DOCUMENTS

| | | | | |
|---|---|---|---|---|
| 4,702,190 A | * | 10/1987 | Conrad | 114/102.31 |
| 4,708,080 A | * | 11/1987 | Conrad | 114/102.31 |
| 6,112,689 A | * | 9/2000 | Baudet | 114/102.33 |
| 6,302,045 B1 | | 10/2001 | Mahr | |
| 6,311,633 B1 | * | 11/2001 | Keire | 114/102.33 |
| 6,332,420 B1 | | 12/2001 | Rodgers | |
| 6,382,120 B1 | | 5/2002 | Keire | |

FOREIGN PATENT DOCUMENTS

| | | |
|---|---|---|
| EP | 0 271 215 | 6/1988 |
| WO | WO 02/055380 | 7/2002 |
| WO | WO 2004/041636 | 5/2004 |

* cited by examiner

*Primary Examiner*—Lars A. Olson
(74) *Attorney, Agent, or Firm*—Hamre, Schumann, Mueller & Larson, P.C.

(57) ABSTRACT

A sail having at least three tops and three corresponding edges opposite the tops and comprising a plurality of panels each of which in turn comprises two outer covering layers, between which a plurality of reinforcement elements are positioned which define, in their entirety, a multi-directional main reinforcement structure. The plurality of reinforcement elements are disposed in a pre-determined manner with respect to three generatrix lines, which have in common a determinate reference point, disposed in a substantially central position of the sail and each one passing through, or near, one of the three tops.

33 Claims, 16 Drawing Sheets

APPARATUS AND METHOD TO MAKE A SAIL AND RELATIVE SAIL MADE

FIELD OF THE INVENTION

The present invention concerns an apparatus and a relative method to make a sail of the laminated type, and the relative sail thus made. To be more exact, the sail according to the present invention comprises a plurality of panels or sailcloths made of light and flexible material, joined together, each of which comprises two outer layers, between which a plurality of reinforcement elements are positioned. The latter are disposed so as to achieve, in their entirety, a structure to reinforce the sail which has as its origin a determinate point associated with the pressure center of the sail.

BACKGROUND OF THE INVENTION

It is known to produce a sail of the laminated type of a triangular shape having three tops defining respectively three corners, that is, tack corner, head corner and clew corner, and three sides, respectively the foot or base of the sail, between the tack corner and the clew corner, the fore leech or reef, between the tack corner and the head corner, and the after leech, between the clew corner and the head corner.

The sail comprises a plurality of sailcloths joined together by means of stitching or gluing, each of which comprises in turn two outer covering layers, made of plastic material, between which reinforcement elements are positioned, made of carbon fiber. The latter are disposed following the force lines generated on the sail by the state of stress to which it is subjected during use. All together, the reinforcement elements achieve a main reinforcement structure for the sail.

It is also known to insert auxiliary reinforcement elements between the two outer covering layers of all the sailcloths, in order to achieve auxiliary reinforcement structures, for example with regular pre-formed grids or nets, or with bundles of threads angled with respect to the reinforcement threads disposed according to the aforesaid force lines and forming the main reinforcement structure, in order to support secondary forces, always present on the sail, and responsible for considerable deformations of the outer covering layer.

The state of stress acting on the sail is the sum of the stresses of an aerodynamic nature generated by the action of the wind on the surface of the sail, consisting of a field of pressures that varies from point to point, and of stresses imposed by the action of the crew on the sail in order to perform maneuvers, stresses that are transmitted to the sail at the points where the sail is constrained to the boat.

This state of stress is in itself very complex, as it is a function of the structure of the sail itself, and to determine it entails the need to solve what is commonly defined in the state of the art as an aero-elastic problem.

Making sails of a laminated type, where the force lines represent a kind of guide direction according to which the reinforcement elements are disposed, has the disadvantage, however, that the reciprocal position and orientation of the force lines vary continuously as the conditions of the wind vary and as the control lines or current maneuvers are adjusted (for example sheets, halyards, flying shrouds or other) by the crew, making it necessary, in practice, to choose one or more design points when designing the sail, and to distribute the reinforcement elements in a way which represents a compromise and is not the best possible solution.

Another disadvantage of sails made in this way is the increase in the number of auxiliary reinforcement elements, which therefore entails a considerable increase in the material used to make the sail, and hence of the weight of the sail.

The solution is also known of making a sail using reinforcement elements that are not disposed on the force lines.

According to this conventional solution, however, large size curved molds are used, which make the method to construct large size sails very inefficient from the economic point of view, and very laborious and complex.

It is also known to make sails by putting a large quantity of reinforcement elements at the points where the sail is constrained to the boat, neglecting the central zone of the sail, which on the contrary is fundamental in order to maintain its shape during use.

It is also known to make sails relying on curves having the same level of stress value, known as iso-stress curves. However, this approach also has the disadvantage that one force condition from among the infinite possibilities is chosen, and since, between one iso-stress curve and the next, the stress is not constant but continuously varies, a structure like the one proposed would in fact only be iso-stress if one were to have recourse to infinite iso-stress elements, something which is impossible in practice.

One purpose of the present invention is to achieve an apparatus and perfect a method to make a sail wherein the reinforcement elements are dependent directly on the state of stress to which the sail is subject, and not on the force lines acting on the sail, which are a consequence of said state of stress, with the purpose of guaranteeing a better maintenance and control of the shape, a greater strength and duration given the same weight with respect to other sails of the laminated type.

The Applicant has devised, tested and embodied the present invention to overcome the shortcomings of the state of the art and to obtain these and other purposes and advantages.

SUMMARY OF THE INVENTION

The present invention is set forth and characterized in the main claims, while the dependent claims describe other characteristics of the invention or variants to the main inventive idea.

In accordance with the above purpose, a sail according to the present invention has three tops and three corresponding edges opposite said tops and comprises a plurality of panels, joined together in a conventional manner.

Each panel comprises two outer covering layers, between which a plurality of reinforcement elements are positioned, which define, in their entirety, a multi-directional main reinforcement structure of the sail.

According to a characteristic of the present invention, the plurality of reinforcement elements are disposed in a pre-determined manner with respect to three generatrix lines, respectively first, second and third, having in common a determinate reference point, disposed in a substantially central position of the sail, and each one passing through one of the said three tops.

The three generatrix lines are all divided into the same number n of intermediate points, numbered from 1 to starting from the intermediate point nearest the reference point, through which the reinforcement elements pass. The latter are divided into at least three groups, respectively first, second and third group.

According to an advantageous form of embodiment, in the first group of reinforcement elements, a first reinforcement element passes both through a first intermediate point of the first generatrix line and adjacent to the reference point, and also through the nth intermediate point of the second generatrix line disposed as far as possible from said reference point. A second reinforcement element passes both through a second intermediate point of the first generatrix line, adjacent to the first intermediate point, and also through an intermediate point n−1 of the second generatrix line, and so on until an nth reinforcement element passes both through the nth intermediate point of the first generatrix line and also through a first intermediate point of the second generatrix line.

In the second group of reinforcement elements, a first reinforcement element passes both through the first intermediate point of the first generatrix line Wand also through the nth intermediate point of the third generatrix line, disposed as far as possible from the reference point. A second reinforcement element passes both through the second intermediate point of the first generatrix line, and also through an intermediate point n−1 of the third generatrix line and so on until an nth reinforcement element passes both through the nth intermediate point of the first generatrix line and also through a first intermediate point of the third generatrix line.

In the third group of reinforcement elements, a first reinforcement element passes both through the first intermediate point of the second generatrix line and also through the nth point of the third generatrix line, a second reinforcement element passes both through the second intermediate point of the second generatrix line, and also through the intermediate point n−1 of the third generatrix line and so on until a last reinforcement element passes both through the nth intermediate point of the second generatrix line and also through the first intermediate point of the third generatrix line.

The reinforcement elements intersect in twos at points that are always distinct, thus ensuring a minimum thickness of the sail at the points of intersection between the reinforcement elements and a minimum use of reinforcement elements given the same surface reinforced.

According to a variant, at least some of the reinforcement elements of at least one of the three groups into which the totality of the reinforcement elements is divided, are parallel to each other.

The reference point considered advantageously coincides with the pressure center of the sail, that is, with the point through which the resultant of the field of pressure acting on the sail passes. The pressure center is an optimum reference point to make the reinforcement structures of a sail, since its position varies little in the event of small disturbances in the field of pressure caused, for example, by variations in the direction of the wind, or by maneuvers made by the crew of the boat where the sail is assembled.

In order to make the main reinforcement structure, the n intermediate points used are advantageously disposed at the same distance from each other and comprised between the pressure center and the corresponding top through which each generatrix line passes.

According to a variant, the said plurality of reinforcement elements also achieves at least a multi-directional auxiliary reinforcement structure, able to cooperate with the main reinforcement structure in order to give greater resistance to the sail.

According to another variant, the auxiliary reinforcement structure is defined according to the pressure center and the three generatrix lines determined for the main reinforcement structure. The generatrix lines are divided into a plurality of intermediate points, which are suitably distanced from each other, are also disposed on the extensions of the generatrix lines with respect to the relative tops and are suitably connected with each other by means of the reinforcement elements.

According to another variant, the auxiliary structure is defined according to a new pressure center, calculated for a different force condition than that considered in order to determine the pressure center relating to the main reinforcement structure.

The method to make the sail according to the present invention comprises in sequence the following steps:
  a step of virtual definition of the main reinforcement structure;
  a second step of depositing the reinforcement elements on each panel according to the geometry of the main reinforcement structure;
  a step of joining the panels to each other, so as to confer on the sail a determinate aerodynamic profile and so that the reinforcement elements achieve, in their entirety, the desired main reinforcement structure.

The virtual definition step comprises in sequence the following sub-steps:
  a first sub-step of determining the pressure center of the sail;
  a second sub-step of plotting the three generatrix lines;
  a third sub-step of virtual realization of the geometry of the main reinforcement structure;
  a fourth sub-step of virtual realization of the geometry of the auxiliary reinforcement structure.

In the third sub-step of virtual realization of the geometry of the main reinforcement structure, first of all the division of the segments of all three generatrix lines, comprised between the pressure center and the top of the corresponding generatrix line, is effected, in the same number n of intermediate points, suitably distanced from each other. Then, said intermediate points are connected withgether by means of a plurality of curves, for example geodetic curves, as seen previously for the reinforcement elements, and said curves are divided into three groups. By varying the number of intermediate points, the number of curves used for the virtual realization of the main reinforcement structure is also varied, and consequently the main reinforcement structure is realized virtually in a parametric manner.

In the fourth sub-step of virtual realization of the geometry of the auxiliary reinforcement structure, the same pressure center and the same generatrix lines are used, including their extensions with respect to the relative tops, of the main reinforcement structure; or a new pressure center is determined, relating to a different state of stress from that used before, and new generatrix lines are plotted; or only segments of the generatrix lines of the main reinforcement structure are used, or otherwise.

The auxiliary reinforcement structure is realized by dividing the generatrix lines, or the considered segments thereof, into a number n of intermediate points, which are then joined by means of curves in the desired manner.

When the step of virtual definition of the geometry of the reinforcement structures is complete, then the disposition step occurs, wherein an apparatus disposes the reinforcement elements on the individual panels, following the curves that define said geometry.

The apparatus comprises means to dispose the reinforcement elements on each panel, which comprise a plurality of positioning devices able, upon command from control means, to continuously vary the distance between the reinforcement elements so as to achieve the main and auxiliary reinforcement structures of the sail with the desired geometry.

The method and apparatus according to the present invention allow to achieve a sail wherein the reinforcement structures are multi-directional, can be generated in a parametric manner and consequently are easily repeatable.

The multi-directional nature of the groups of reinforcement elements is a fundamental feature, it guarantees adequate resistance to the structure of the sail as the direction of the main and secondary forces continuously varies; it therefore guarantees optimum performance of the sail also in functioning points other than the design points and prevents the risk of delamination of the sail.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
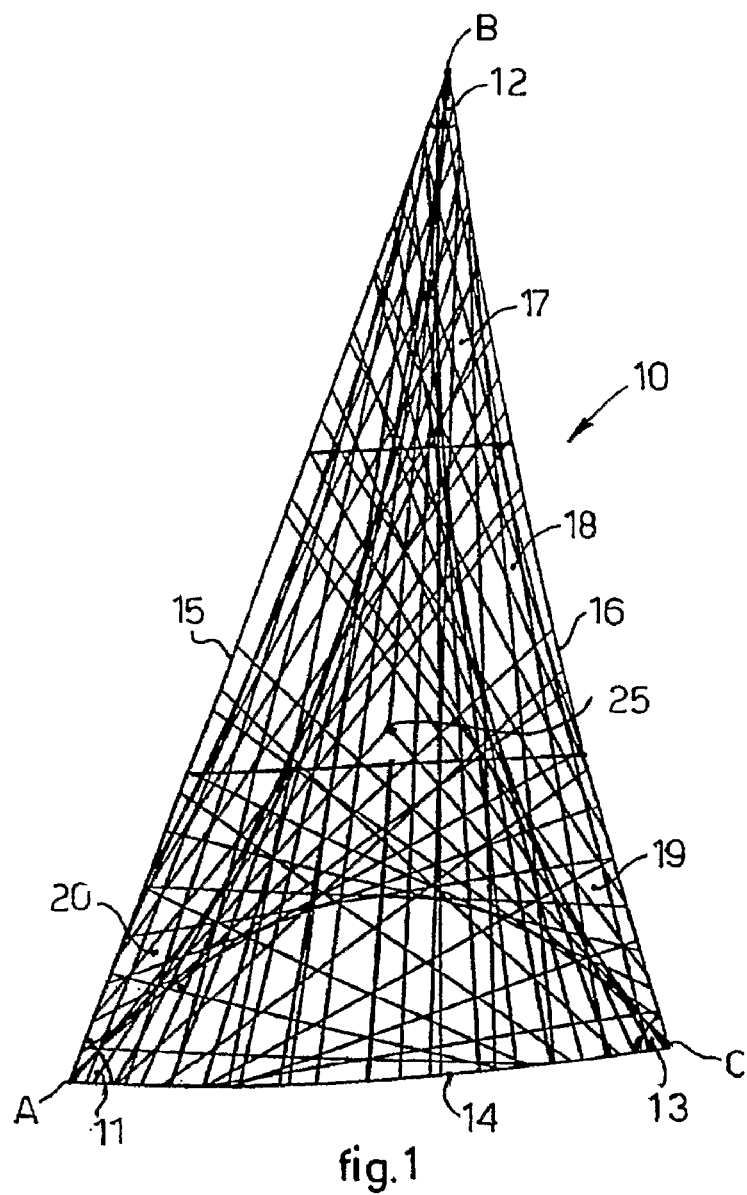
FIG. 1 is a plane view of a sail according to the present invention.

With reference to FIG. 1, a sail 10 according to the present invention, in this case a jib, has three tops, respectively A, B and C, defining respectively the tack corner 11, the head corner 12 and the clew or sheet corner 13, and three sides, respectively foot 14, or base, which connects the top A with the top C, the fore leech 15, or reef, which connects the top A with the top B, and the after leech 16, which connects the top B with the top C.

In this case the sail 10 comprises four panels, or sailcloths, respectively head sailcloth 17, median sailcloth 18, clew sailcloth 19 and tack sailcloth 20, joined together in a conventional manner, for example by means of stitching or gluing of the relative adjacent edges.

Figure 2:
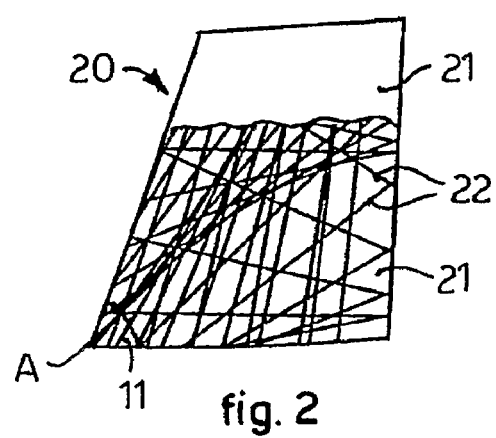
FIG. 2 is a plane view of a detail of FIG. 1.

Each sailcloth 17, 18, 19 and 20 (FIG. 2 relating to the tack sailcloth 20) comprises two outer covering layers 21, between which a plurality of reinforcement elements 22 are positioned, which in their entirety achieve a multi-directional main reinforcement structure 23 (FIG. 5) and, optionally, also at least a multi-directional first auxiliary reinforcement structure 24 (FIG. 7) of the sail 10.

Both the outer covering layers 21 and the reinforcement elements 22 can be made of different materials, natural or synthetic, such as for example polymer materials such as polyethylene terephthalate (PET), like Mylar®, polyester (PES), like Dacron®, polyethylene (PE), high module polyethylene (EMPE), like Spectra®, Dyneema® and Cetran®, polyethylene naphthalene (PEN), like Pentex®, Kaladex® and Teonex®, polyamide (PA), like Nylon®, polypropylene (PP), aramid or para-aramid fibers (PPTA), like Twaron®, Kevlar®, SWM®, ARMOS®, Rusar®, Tecnora®, Aramica® and Mictron®, liquid crystal polymers (LCP) like Vectran®, polybenzobisoxazole (PBO), like Zylon®, poly (diimidazo pyridinylene (di-hydroxide) phenylene) (PIPD), like M5®, fluoropolymers (PVF, PVDF, PTFE, ETFE), like Tedlar® and Teflon®, or of metal or metal alloys, such as for example titanium, aluminum, iron, silver, copper, gold or platinum, or of ceramic material.

Each outer covering layer 21 can be made for example in the form of film, film reinforced using nano-technology, multilayer film based on nano-technology, or of fabric, such as for example taffeta.

Moreover, each outer covering layer 21 can be subjected to treatments that improve its mechanical characteristics, its characteristics of adhesion, resistance to UV rays, resistance to abrasion, humidity or other, such as for example corona poling treatment, chemical etching, spreading, lacquering or coating.

The reinforcement elements 22 can be made in the form of threads, continuous filaments, strips, round pieces, nanotubes, optical fibers or other oblong element and can advantageously be subjected to treatments which improve their mechanical characteristics, their characteristics of adhesion, resistance to UV rays, resistance to abrasion, humidity or other, such as for example impregnation by means of powders, impregnation by means of liquids, covering with thermoplastic adhesives, covering with thermosetting adhesives, or covering with photosensitive adhesives (UV curable adhesives).

Moreover, by combining in various ways the outer layers 21 with the reinforcement elements 22, it is possible to obtain the following constructions of the sail: film-reinforcement-film (traditional laminate); taffeta-film-reinforcement-film; taffeta-film-reinforcement-film-taffeta; taffeta-film-reinforcement-taffeta (consolidated state of the art); taffeta-reinforcement-taffeta.

The method to make the sail 10 provides first of all a step of virtual definition of the reinforcement structures 23 and 24 of the whole sail 10, a second step of disposing the reinforcement elements 22 on the individual sailcloths 17, 18, 19 and 20 following the geometry of the reinforcement structures 23 and 24 obtained virtually in the previous step, and finally a step of joining the sailcloths 17, 18, 19 and 20, including the above reinforcement elements 22, in order to confer on the sail 10 a desired aerodynamic profile.

Figure 3:
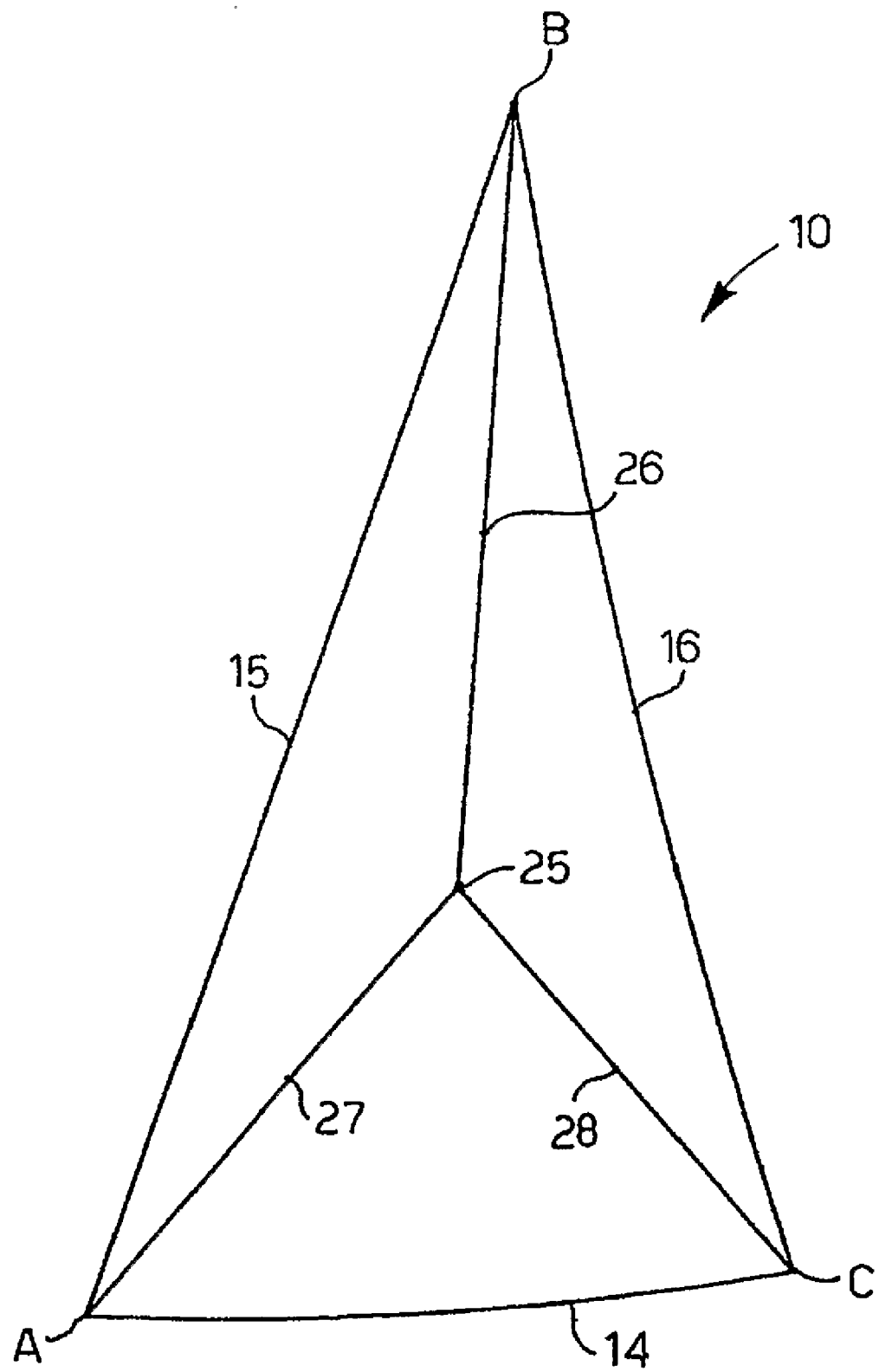
FIGS. 3 to 10 show some steps for the virtual definition of the reinforcement structures, main and auxiliary, of a sail according to the present invention.
Figure 4:
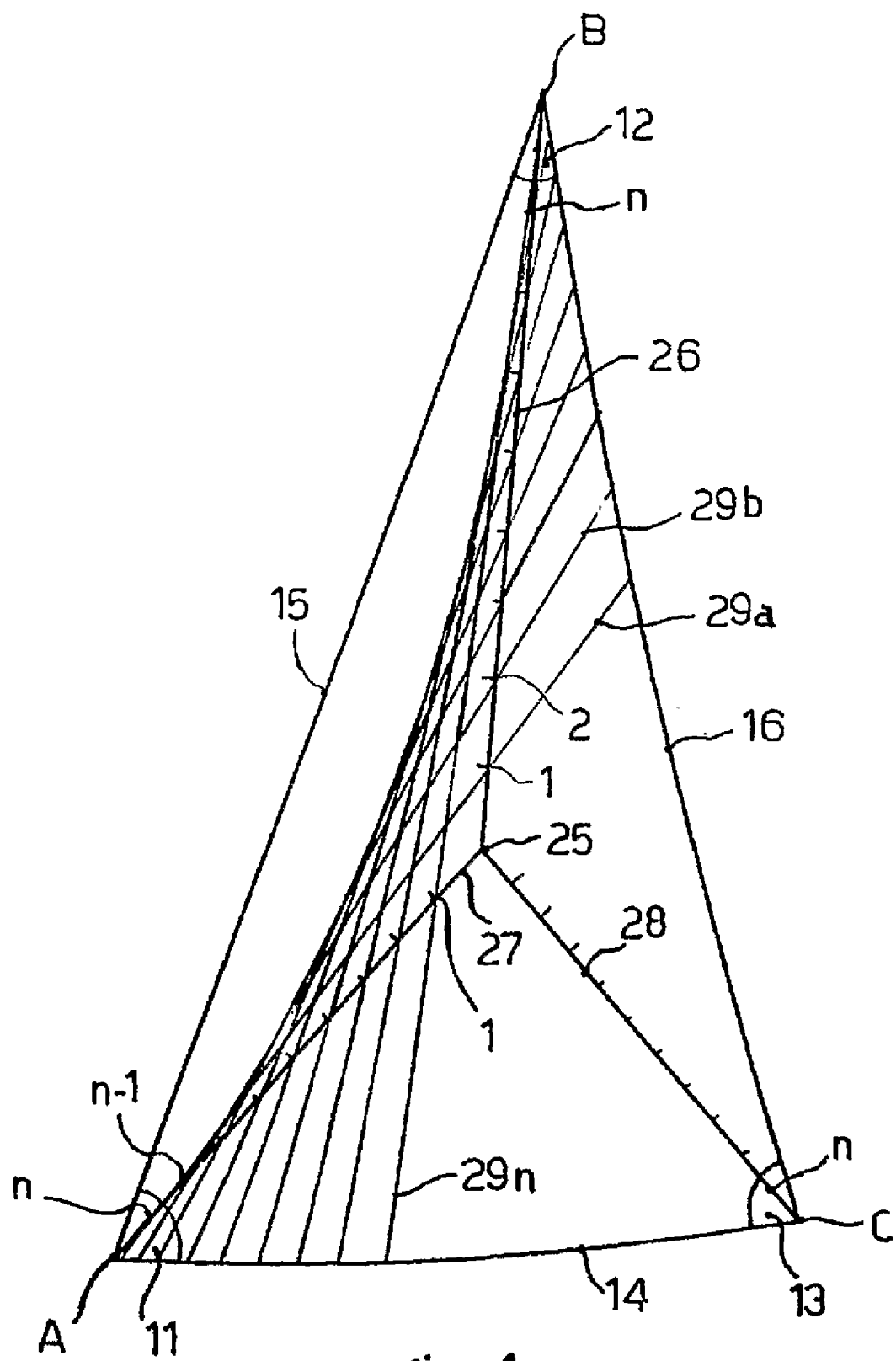
Figure 5:
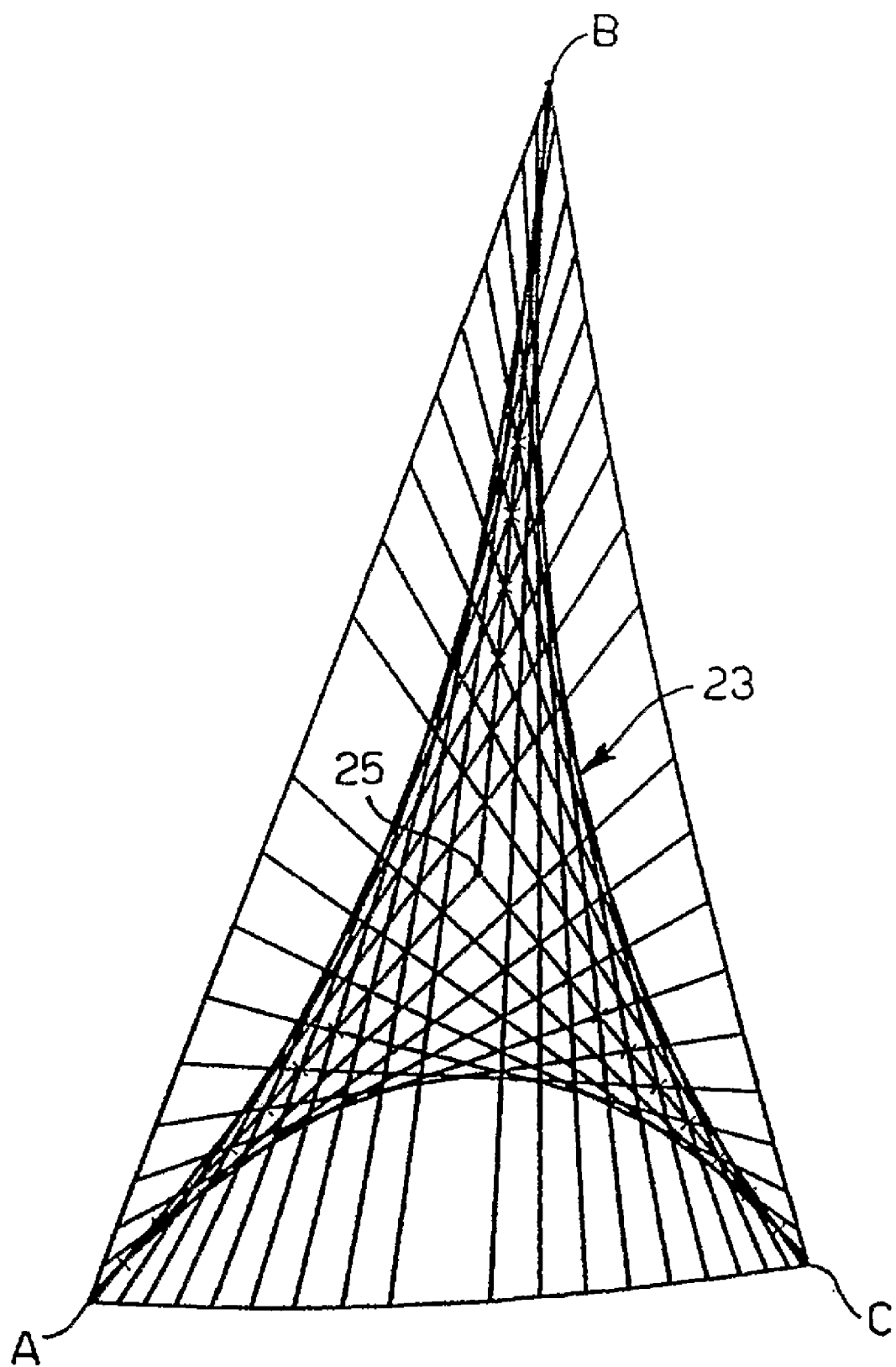
Figure 7:
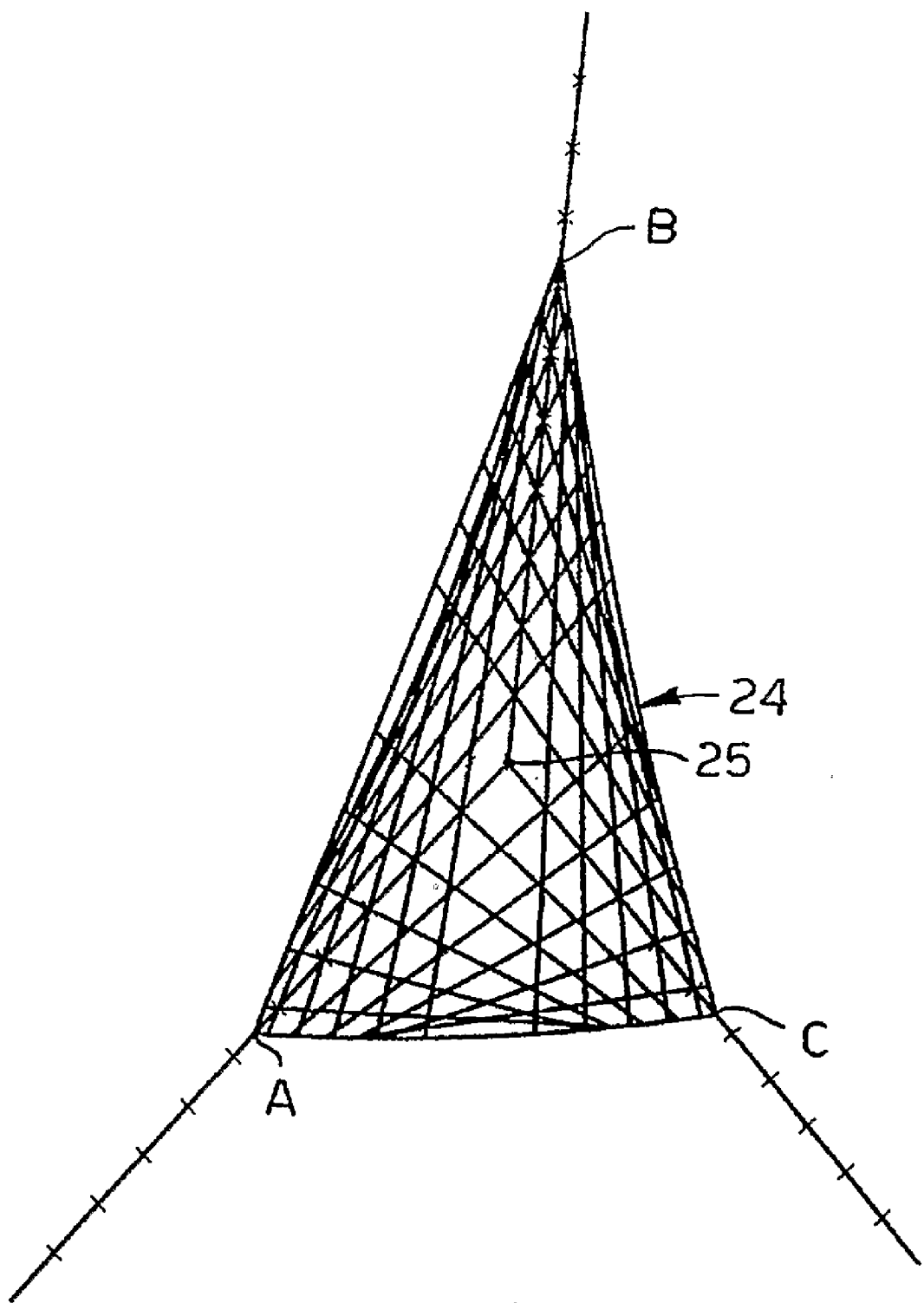

The step of virtual definition of the reinforcement structures 23 and 24 comprises in sequence the following sub-steps:

a first sub-step of determining the pressure center 25 of the sail 10, that is, the point of passage of the resultant of the pressures acting on the whole surface of the sail 10;

a second sub-step of plotting (FIG. 3) three generatrix lines, respectively first 26, second 27 and third 28, originating in the pressure center 25 and passing through respectively the tops B, A and C;

a third sub-step of virtual realization of the main reinforcement structure 23 (FIGS. 4 and 5);

a fourth sub-step of virtual realization of the auxiliary reinforcement structure 24 (FIG. 7).

In order to determine the pressure center 25, the design engineer can work on his own experience, considering indicatively the pressure center as coincident with the geometric center of the sail 10; or he can use instruments of fluid-dynamic calculation or tests in wind tunnels and then, when a certain functioning condition is known, and therefore for example the intensity and direction of wind being known, the gradient of the wind along the vertical direction and the expected speed of the boat, he can know the distribution of the pressures on the surface of the sail, and hence the position of the pressure center 25.

In this case, the distribution of the pressures on the surface of the sail 10 is that relating to a bowline course, that is, the most onerous condition from the structural point of view for a sail.

The third sub-step to make the main reinforcement structure 23 (FIG. 4) provides to use the segments of all three generatrix lines 26, 27 and 28, plotted in the previous sub-step, comprised between the pressure center 25 and the relative tops A, B and C.

Each segment is then divided into the same number of intermediate points, in this case ten, disposed at a constant distance from each other and numbered progressively from one to n starting from the intermediate point adjacent to the pressure center 25.

At this point the n intermediate points of the first generatrix line 26 are connected, by means of a plurality of geodetic curves, with the points of both the second 27 and also of the third generatrix line 28, and the n intermediate points of the second generatrix line 27 are connected with those of the third generatrix line 28, so as to achieve virtually the main reinforcement structure 23 (FIG. 5). To be more exact, the geodetic curves pass through the intermediate points of the generatrix lines 26, 27 and 28 and end in correspondence with the sides 14, 15 and 16 of the sail 10.

The different intermediate points are connected in the following manner (FIG. 4). Considering the intermediate points for example of the first generatrix line 26 and of the second generatrix line 27, the intermediate point one of the first generatrix line 26 is connected by means of a first geodetic curve 29a to the intermediate point n of the second generatrix line 27; the intermediate point two of the first generatrix line 26 is connected with the intermediate point n−1 of the second generatrix line 27 by means of a second geodetic curve 29b and so on, until the intermediate point one of the second generatrix line 27 is connected with the intermediate point n of the first generatrix line 26, by a geodetic curve 29n. In this way, a first group of geodetic curves is created, following which, during the disposition step, the reinforcement elements 22 are disposed on the individual sailcloths 17, 18, 19 and 20, thus creating a first group of reinforcement elements.

In the same way, the intermediate points of the first generatrix line 26 are connected with those of the third generatrix line 28 and the intermediate points of the second generatrix line 27 with those of the third generatrix line 28, thus obtaining virtually the main reinforcement structure 23.

Figure 6:
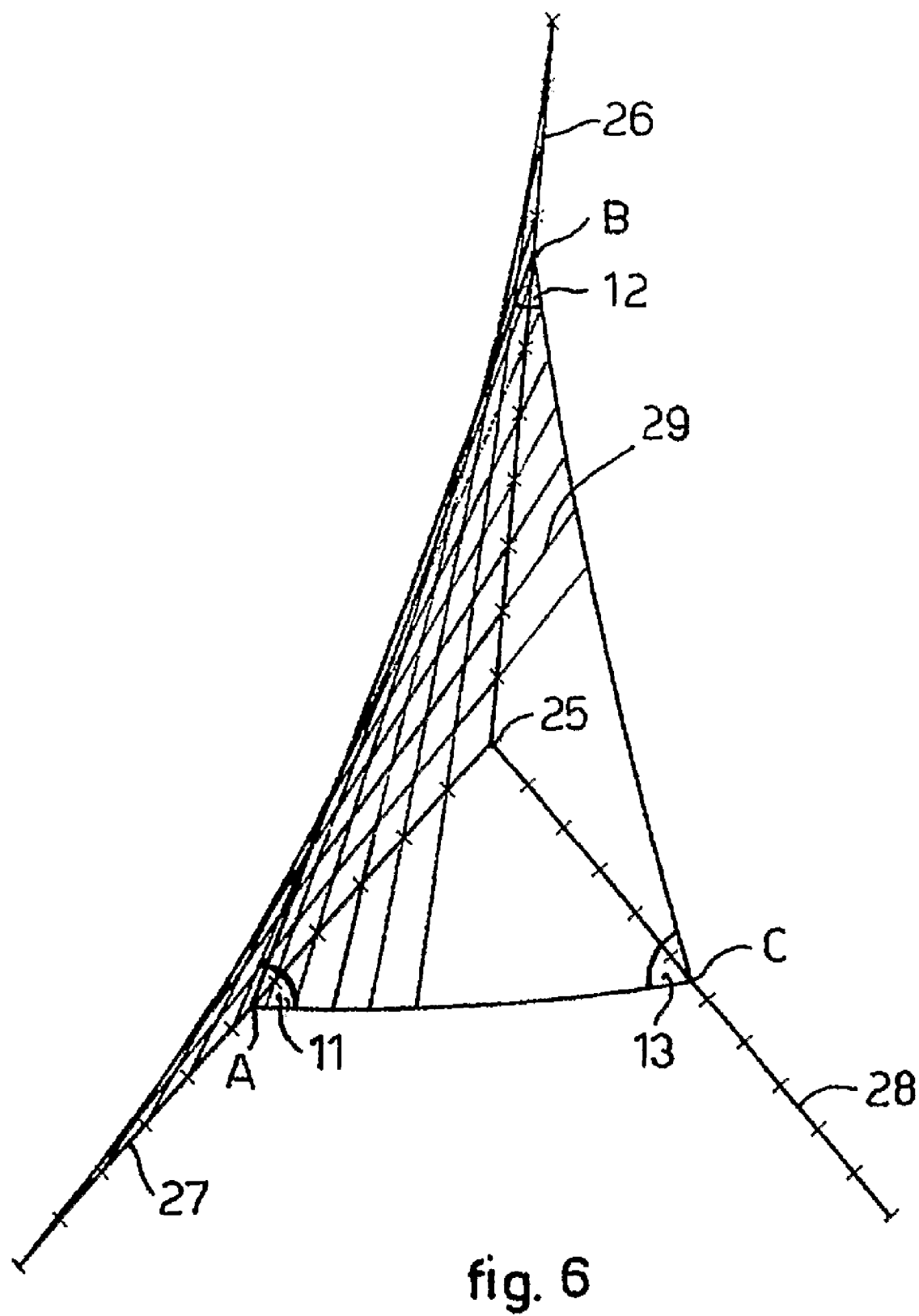

The fourth sub-step of virtual realization of the auxiliary reinforcement structure 24 (FIGS. 6 and 7) provides in this case to use the same pressure center 25 determined for the main structure 23 and the same generatrix lines 26, 27 and 28, of which the extensions with respect to the corners 11, 12 and 13 of the sail 10 are also used.

The generatrix lines 26, 27 and 28 (FIG. 6) are then divided into the same number n of intermediate points, in this case eleven, disposed at a constant distance from each other and connected with each other by means of geodetic curves 29 in the way described for the virtual realization of the main reinforcement structure 23.

Figure 8:
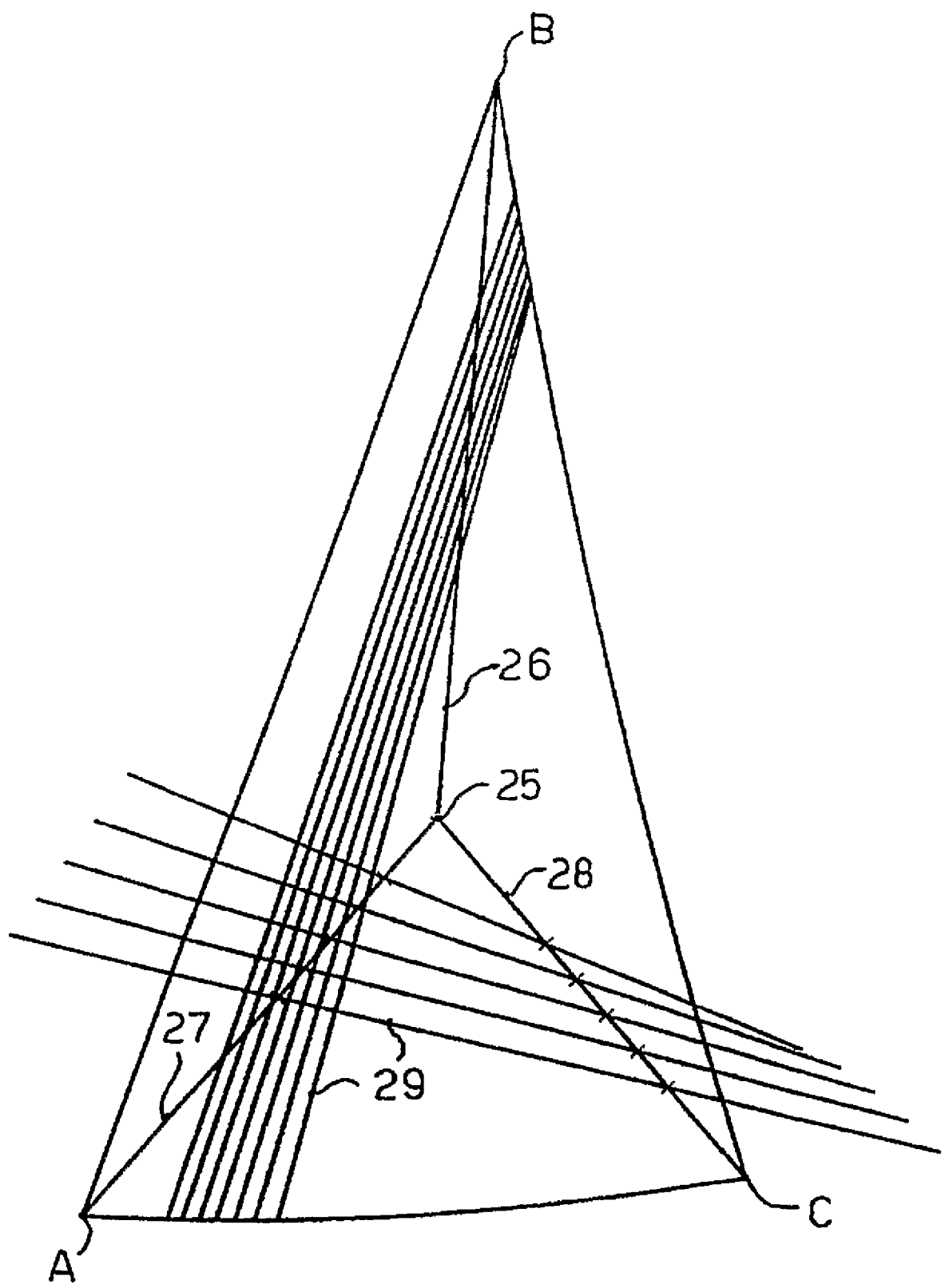

In accordance with another characteristic of the present invention, apart from the main reinforcement structure 23 and secondary 24, another auxiliary reinforcement structure (FIG. 8) can be made, using only a part of all three generatrix lines 26, 27 and 28. Each part is divided into a determinate number of intermediate points, which are connected with each other by means of the reinforcement elements 22, without the latter intersecting.

According to a variant, the reinforcement elements 22 are divergent with respect to each other and are never aligned with the main lines of force of the sail 10, indeed they intersect them at one or more points for any force condition according to which the lines of force are calculated.

Alternatively, it is also possible to dispose bundles of divergent elements the direction of which is determined by the passage through two points belonging to two different generatrix lines of the primary or secondary structure.

The auxiliary reinforcement structures can also comprise several groups of reinforcement elements 22 constructed on the three generatrix lines 26, 27 and 28.

Figure 9:
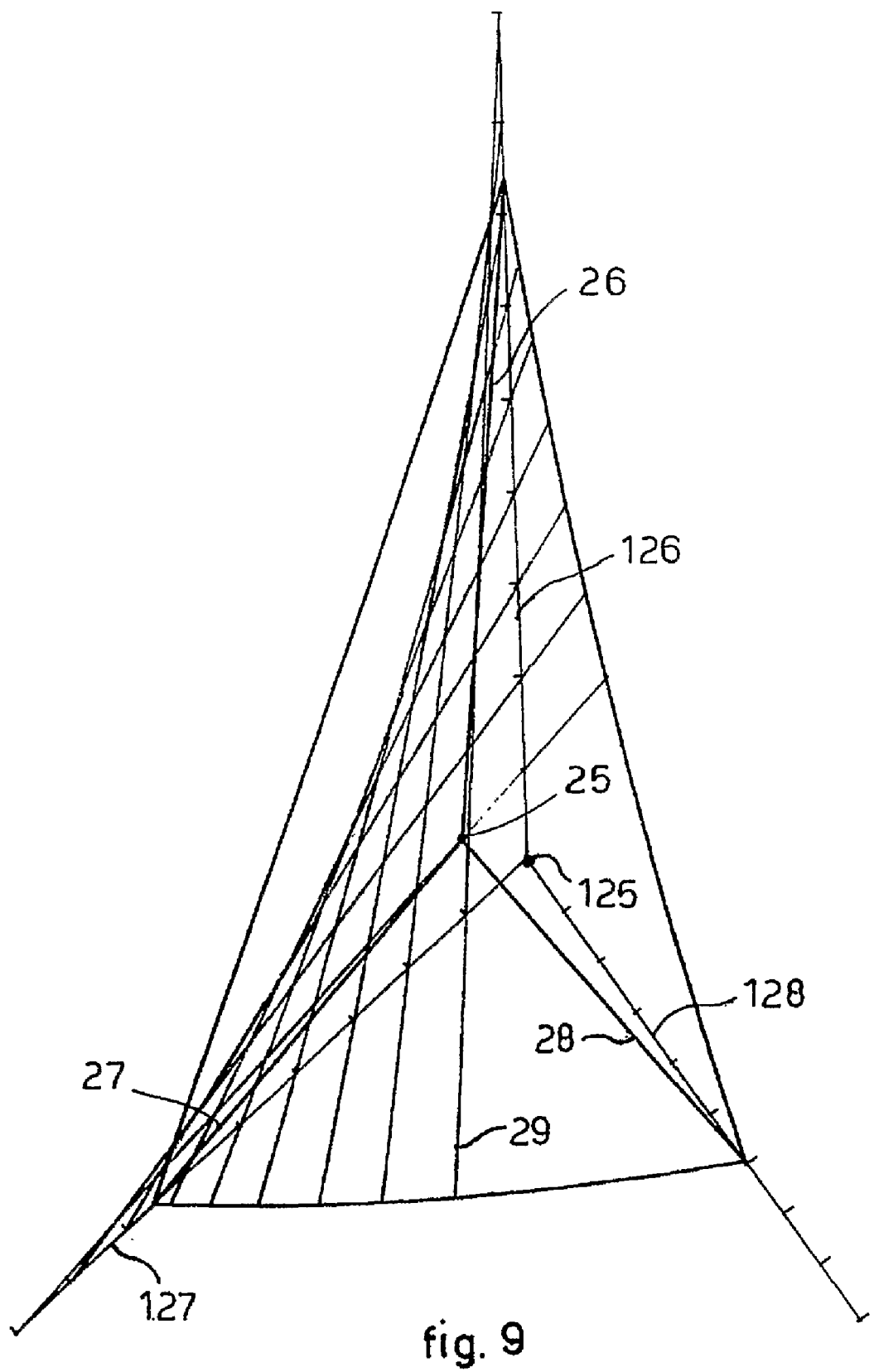

According to another variant, shown for example in FIG. 9, an auxiliary reinforcement structure is made first by determining a different pressure center 125 from that used to make the main reinforcement structure, for example calculated considering other courses than a bowline, hence considering different force conditions on the sail 10. Then the generatrix lines 126, 127 and 128 are plotted, corresponding to the new pressure center 125, and are divided into n intermediate points which are connected by means of the geodetic curves 29.

Figure 10:
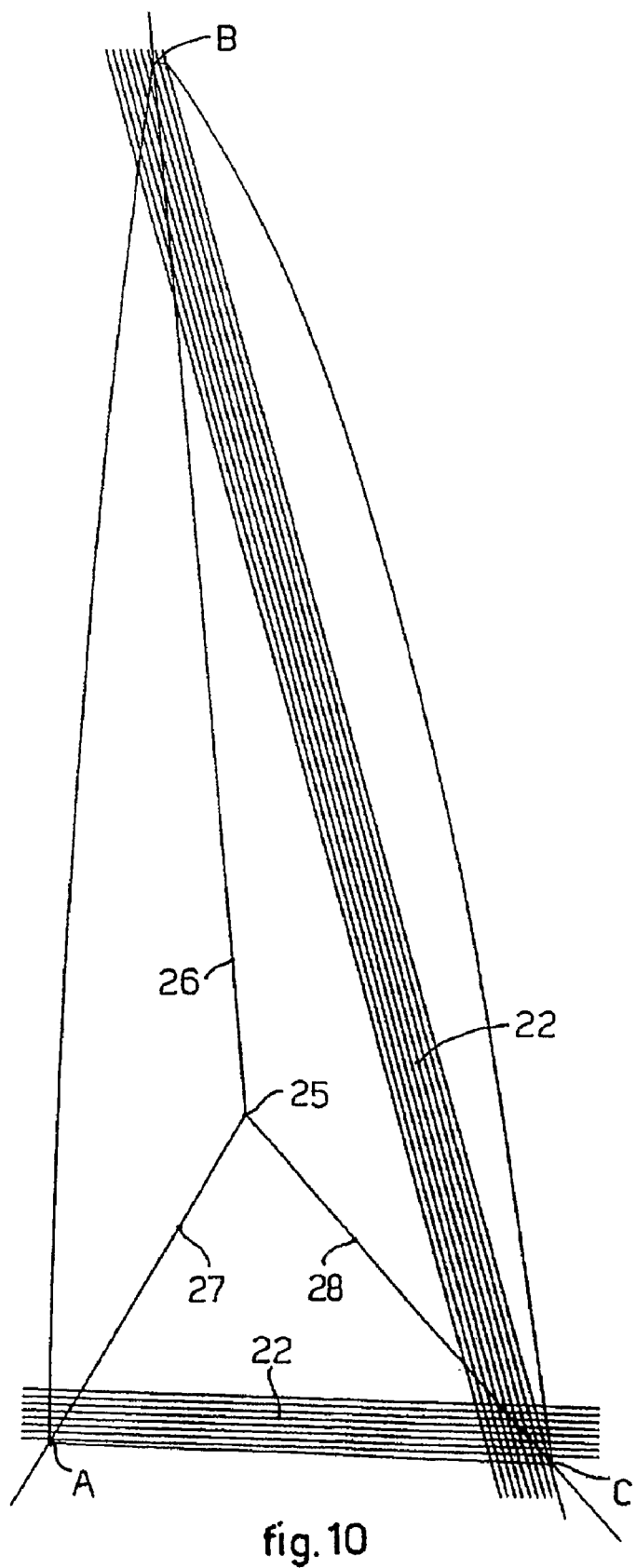
Figure 11:
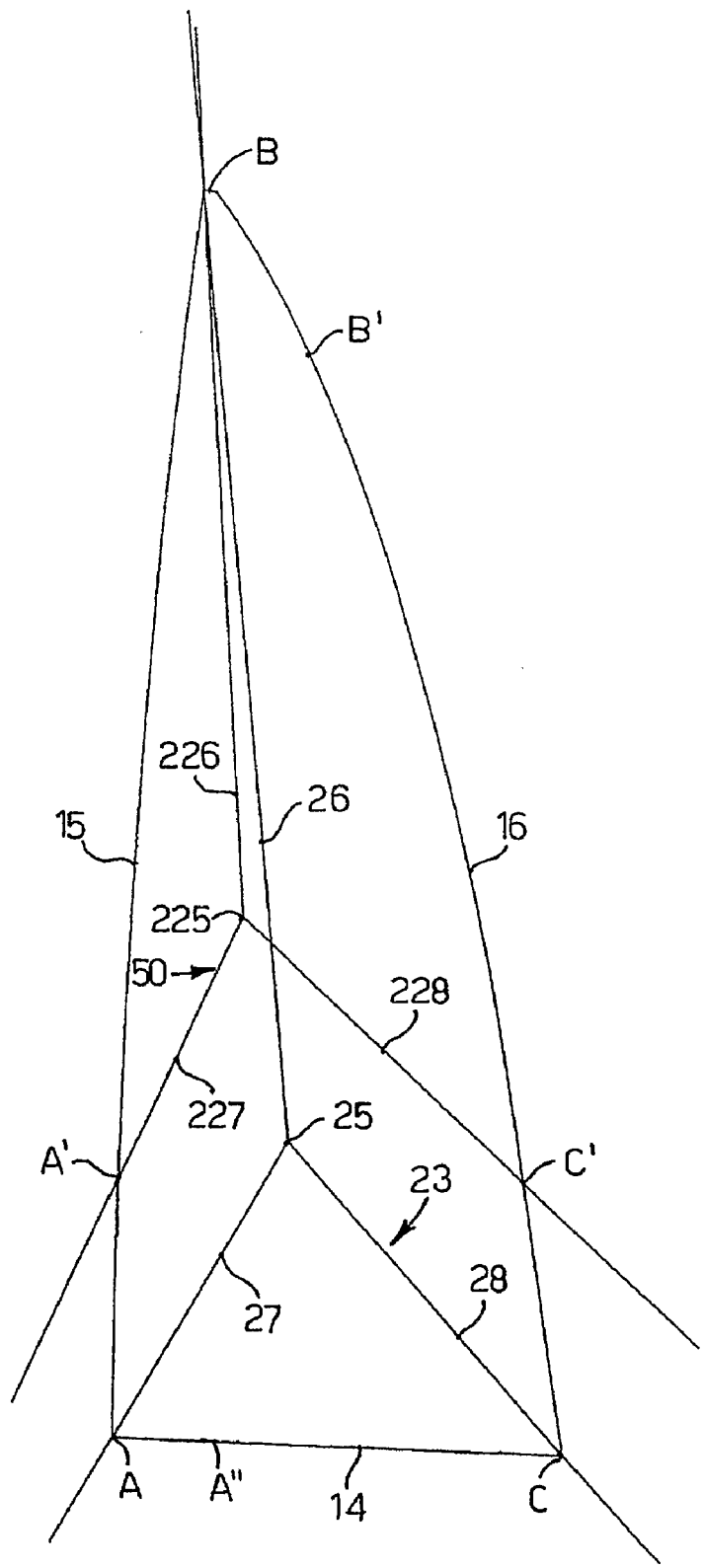
FIGS. 11 to 14 show some steps for the virtual definition of a second auxiliary reinforcement structure of a sail according to a variant.
Figure 12:
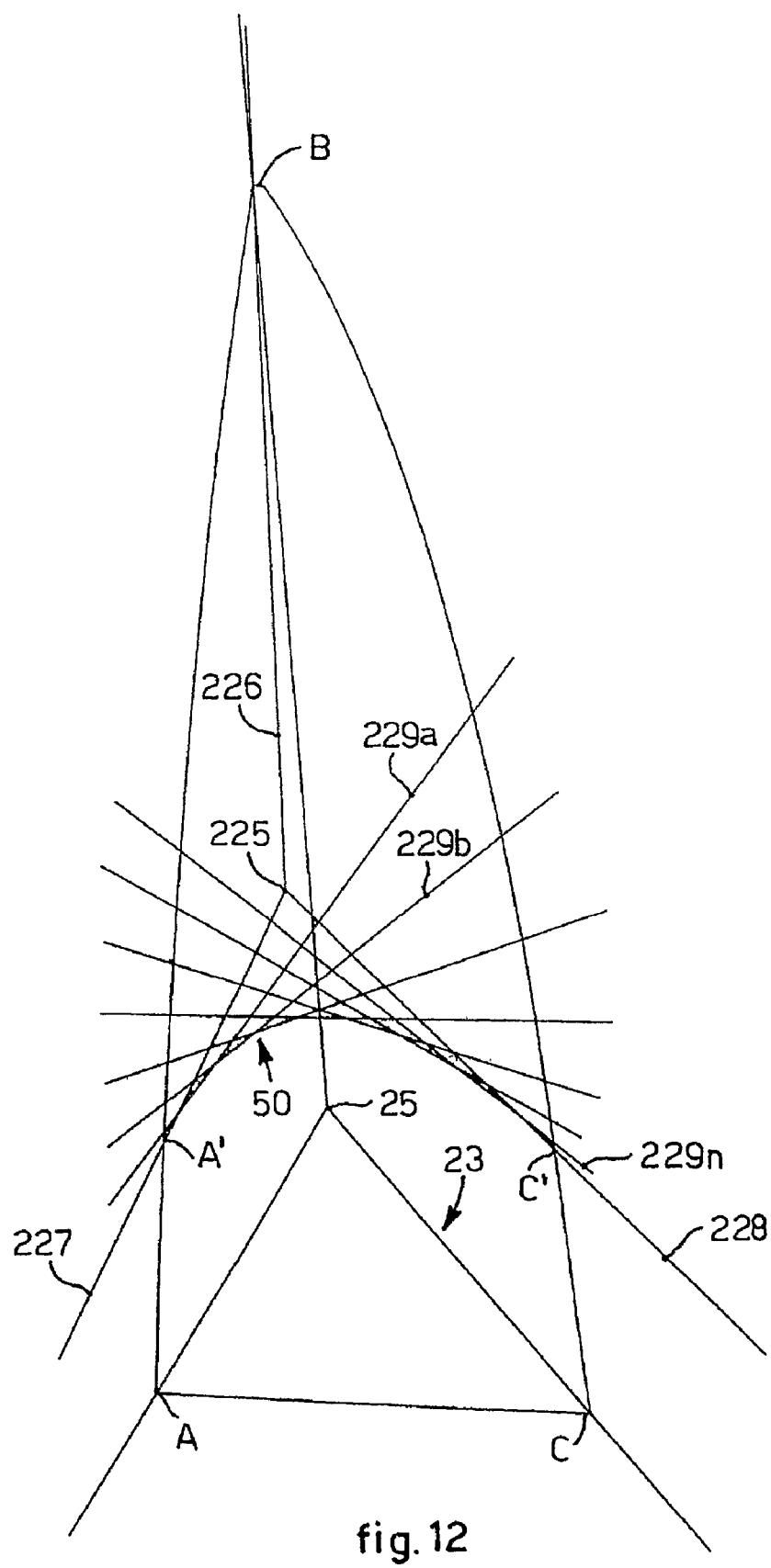
Figure 13:
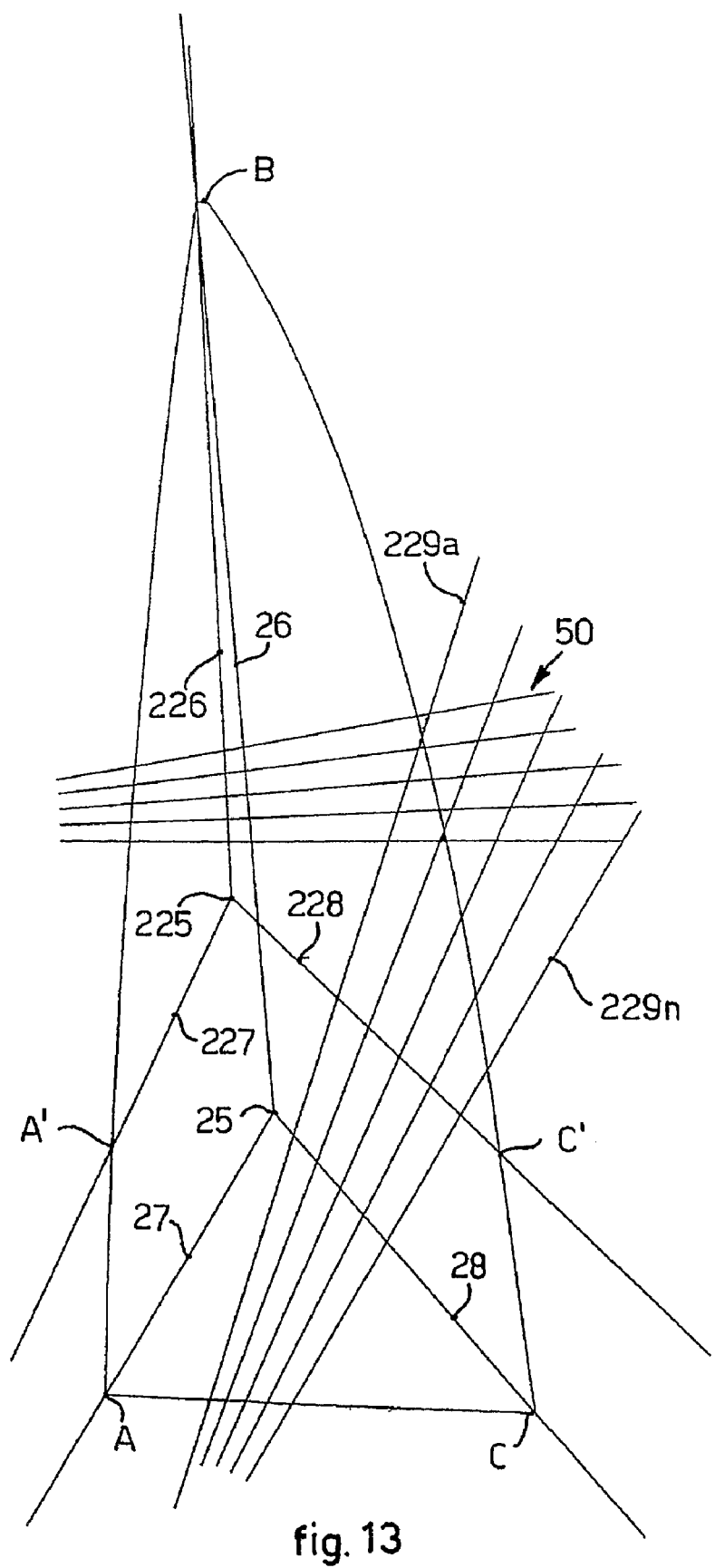
Figure 14:
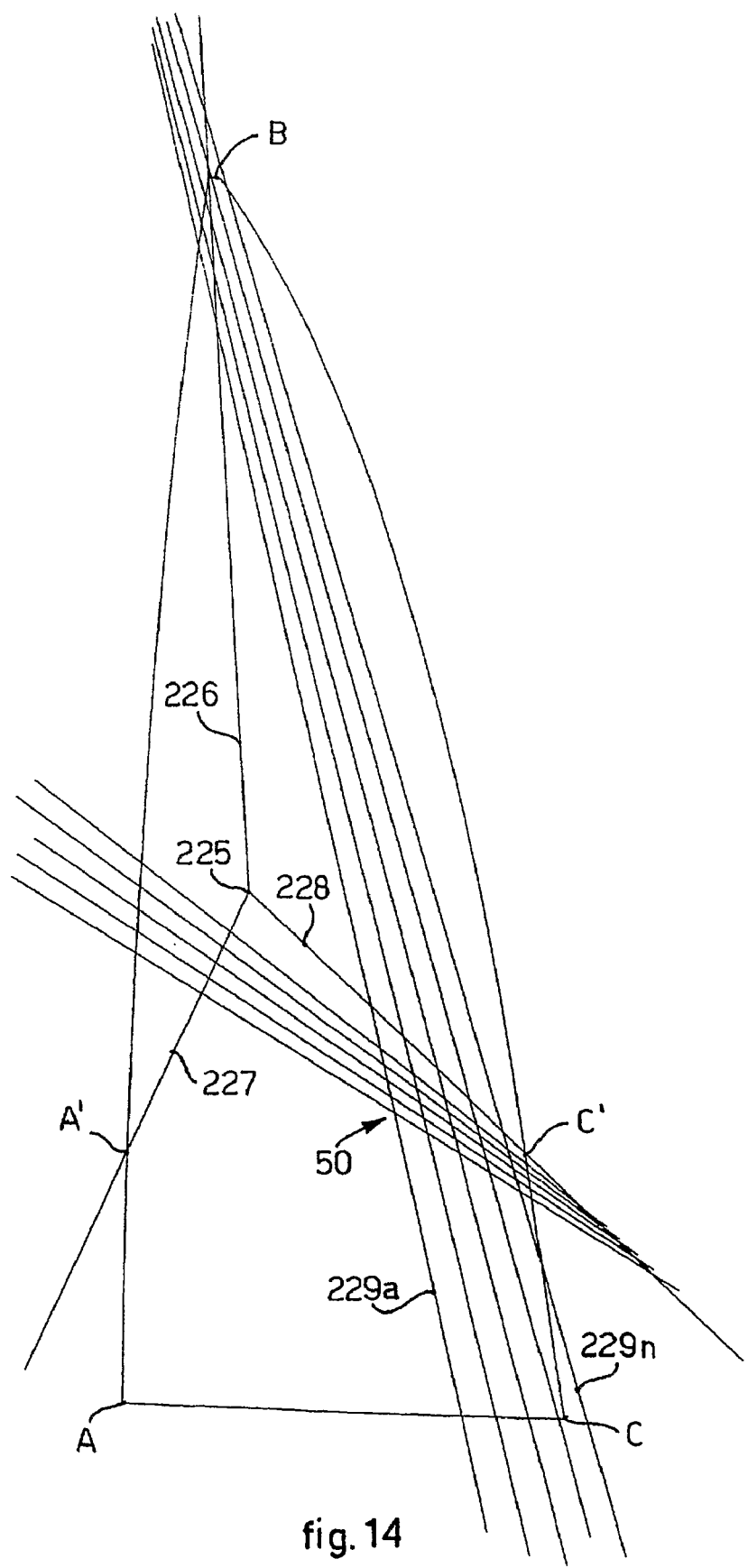

According to another variant, shown in FIG. 10, the reinforcement elements 22, of one or more groups of reinforcement elements, are parallel to each other.

According to another variant, shown in FIGS. 11 to 14, in addition to or instead of the first auxiliary reinforcement structure 24, it is provided to achieve a second auxiliary reinforcement structure 50, mainly to deal with the need to reduce the sail surface of the sail, which in the event of a mainsail corresponds to the operation of taking in/out a reefs In fact, in the event of strong wind, or emergency situations, that is, when it is necessary to reduce the surface of the sail exposed to the action of the wind, it is also necessary not only to modify the center from which the generatrix lines originate, taking it from point 25 to point 225, but also to modify two of the tops, respectively A (tack) and C (sheet), making them coincide with the new points A' (tack) and C' (sheet). The new generatrix lines will thus be those indicated by 226, 227, and 228.

Reinforcement elements 229a-229n join intermediate points of the three generatrix lines 226, 227 and 228 and intersect each other.

If the sail 10 is a jib, the three generatrix lines (not shown in the drawings) pass through a new tack point A" (FIG. 11), disposed on the foot 14, and a new head point B', disposed on the after leech 16, according to how the reduction in the surface of the sail is made.

When the maneuver is completed, there will be a new tack point and a new sheet point defined during the design stage by the sail maker, and also a new pressure center.

It is also possible, but not necessary, to insert one or more auxiliary structures constructed considering the new tack point A', the new sheet point C', and the new pressure center 225.

It may then be necessary to dispose reinforcement elements in a transverse direction in the upper part of the sail.

To do this it is sufficient to use portions of generatrix lines belonging to different structures, for example main structure 23 and an auxiliary structure 50. For example it is possible to dispose divergent reinforcement elements the direction of which is determined by the passage through two points belonging to two different generatrix lines of the main structure 23 or the auxiliary structure 50 or of both.

Moreover, in each sail, whether it be a jib or a mainsail, it is possible, but not indispensable, to insert and laminate one or more pockets in order to contain corresponding battens or possibly the entire batten during the process of laminating the sail.

The battens can be of the traditional type, rigid or of the inflatable type.

Moreover, in correspondence with the pockets which contain the battens, it is possible, but not indispensable, to dispose reinforcement elements that distribute, on the main structure and on the auxiliary structure of the sail, the forces acting on the batten.

In presence of the control lines of the reefs and Cunningham, it is also possible, but not indispensable, to insert other reinforcement elements in order to absorb and distribute the forces concentrated on the primary and auxiliary structure of the sail.

Figure 15:
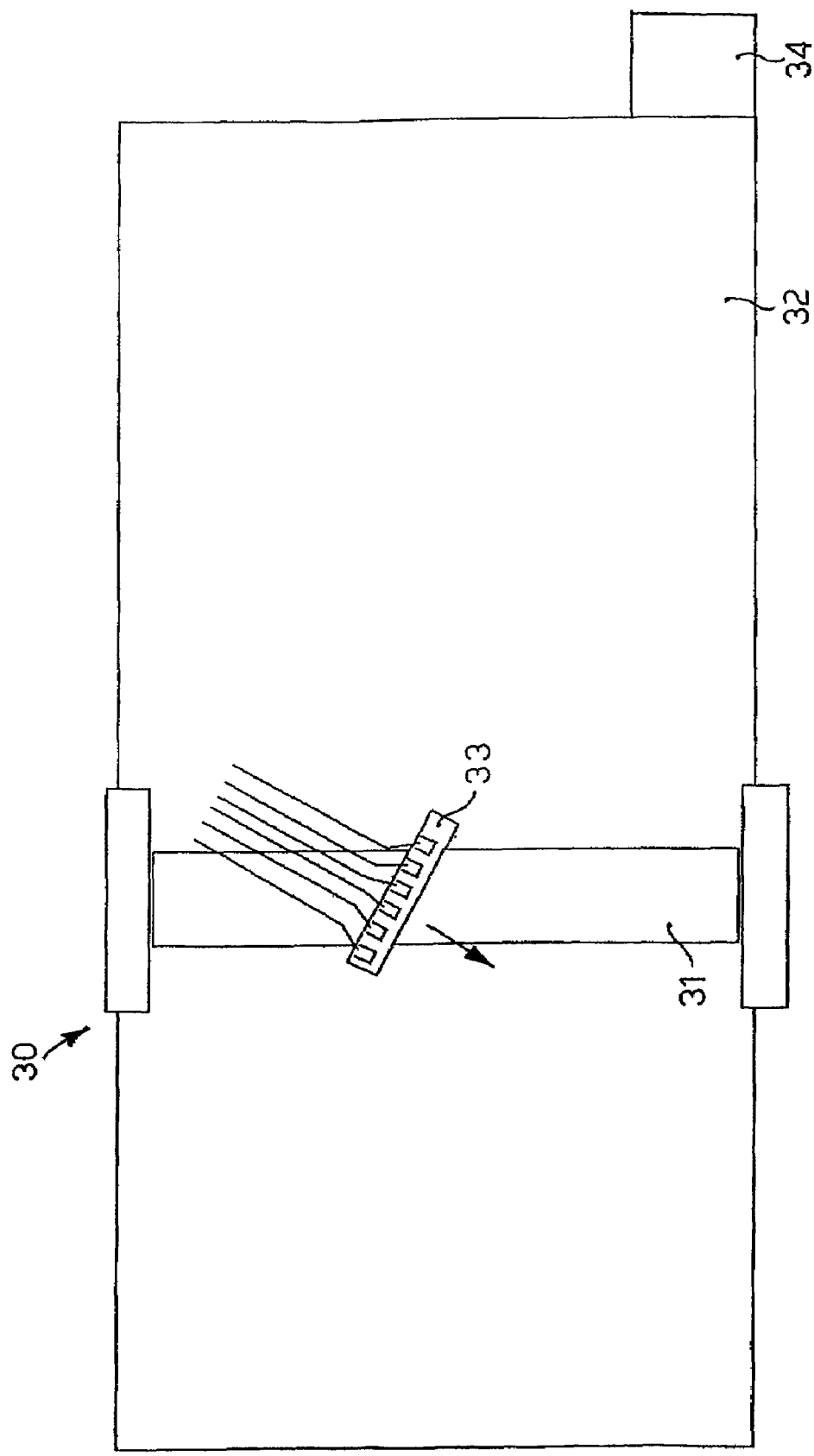
FIG. 15 is a plane view of an apparatus to make a sail according to the present invention.

The step of disposing the reinforcement elements 22 is effected by an apparatus 30 (FIG. 15) which disposes the reinforcement elements 22 on the individual sailcloths 17, 18, 19 and 20, following the geodetic curves 29, 29a, 29b and 29n, and also the possible geodetic curves 229a, 229b, 229n, which virtually achieve the geometry both of the main reinforcement structure 23, and of the first auxiliary reinforcement structure 24 and also of the second auxiliary reinforcement structure 50.

The apparatus 30 comprises a base 31 able to slide on a work plane 32, on which the sailcloths 17, 18, 19 and 20 are disposed, a thread-laying head 33, assembled rotatable and sliding on the base 31, and a control unit 34, in which the geometry of the reinforcement structures 23 and 24 to be made is memorized.

Figure 16:
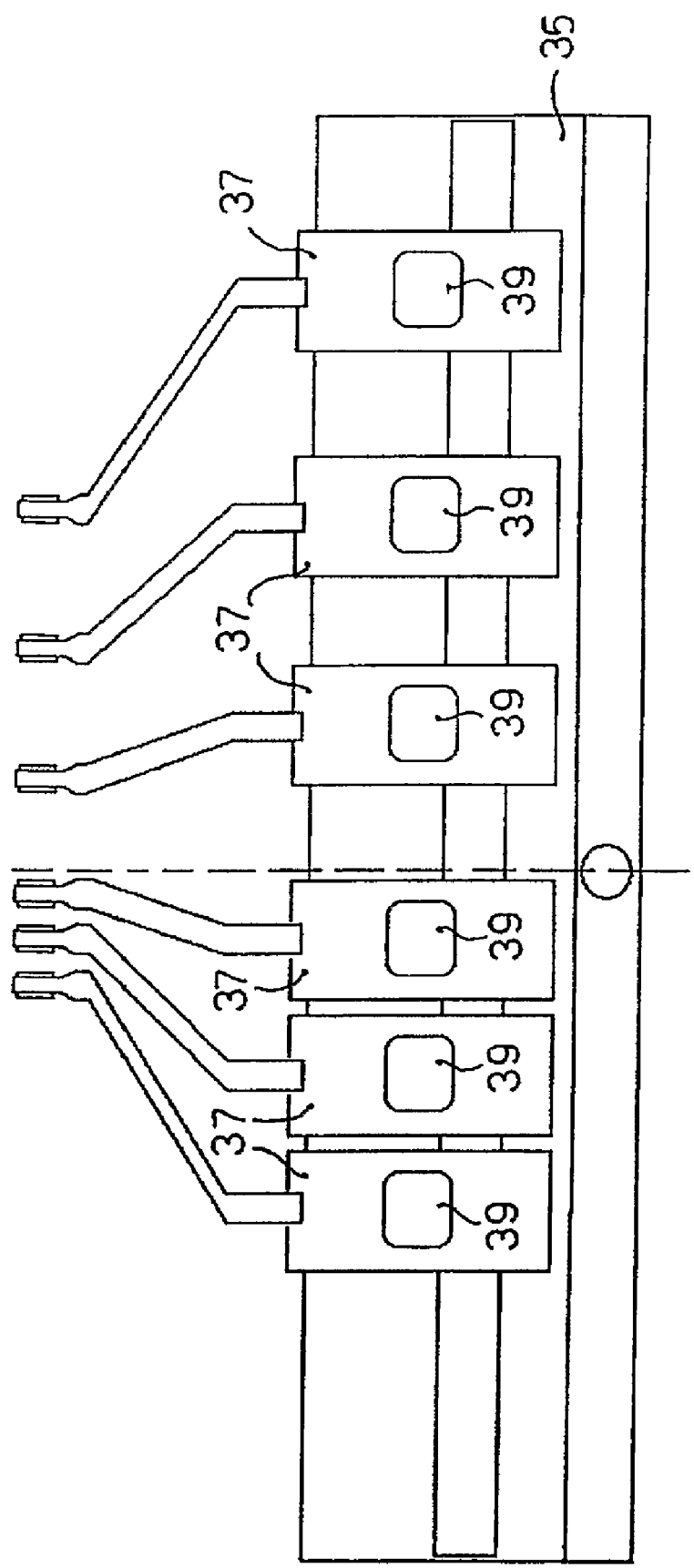
FIG. 16 is an enlarged plane view of a detail of FIG. 15.
Figure 17:
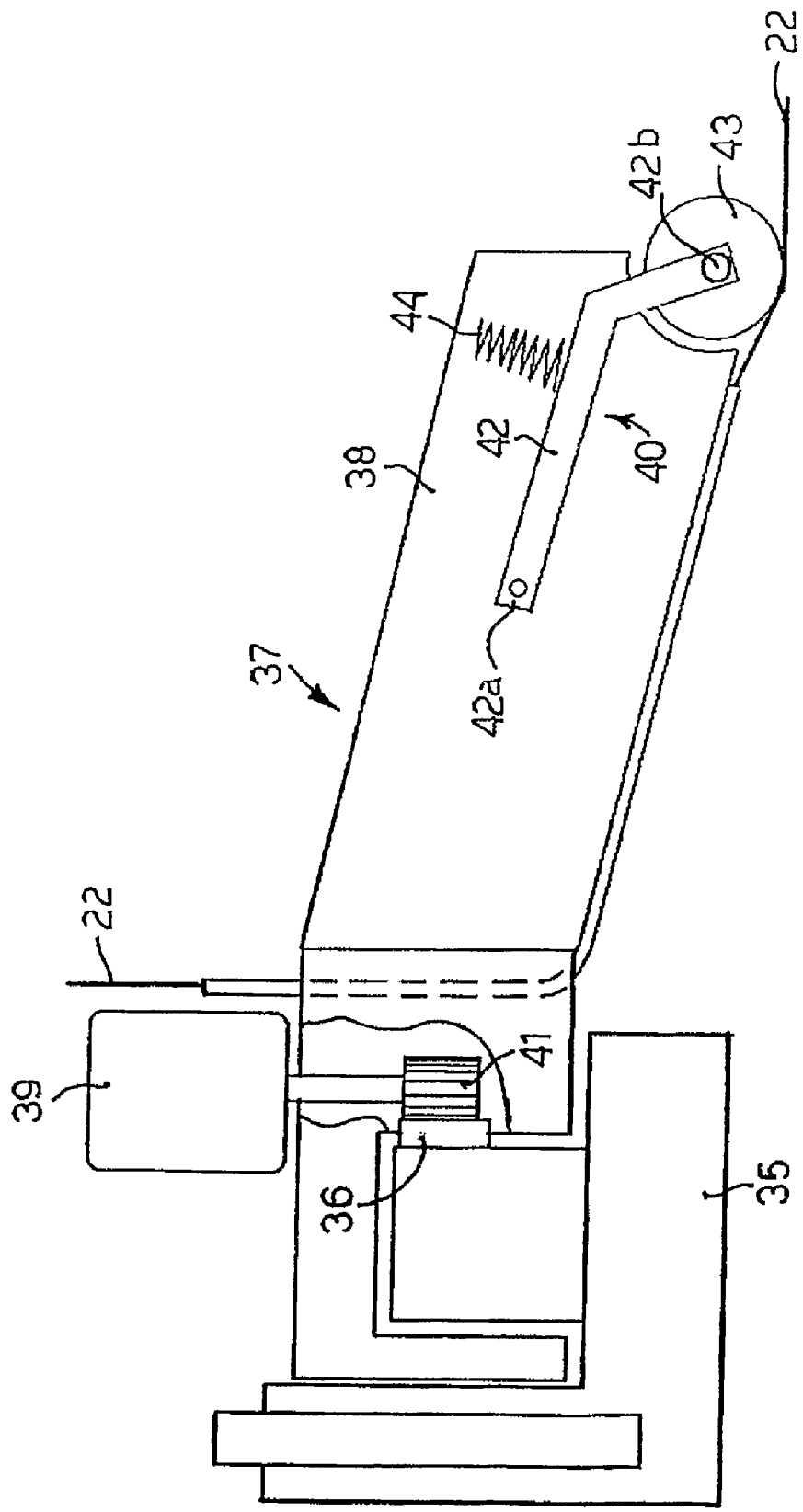
FIG. 17 is an enlarged side view of a detail of FIG. 16.

The thread-laying head 33 (FIGS. 16 and 17) comprises a metal guide 35, on which a rack 36 is assembled and, sliding thereon, six positioning devices 37, each one able to dispose on the sailcloths 17, 18, 19 and 20 a single reinforcement thread 22, following the geometry of the main 23 and auxiliary 24 reinforcement structures.

Each positioning device 37 comprises a support 38, assembled sliding on the guide 35, on which an electric motor 39, in this case of the pitch type, and a pressure unit 40 are assembled.

The electric motor 39 is connected to a gear 41, which in turn is connected to the rack 36 assembled on the guide 35. A rotation imposed by the electric motor 39 on the gear 41 causes a displacement of the individual positioning device 37 along the guide 35 of the thread-laying head 33, thus varying the distance between the reinforcement threads 22 according to the geometry of the reinforcement structures 23 and 24 to be achieved.

The pressure unit 40 comprises a shaped rod 42, hinged with one end 42a on the support 38, a pressure roller 43, assembled at one end 42b of the rod 42 and below which the reinforcement thread 22 runs, and a spring 44, connected both to the rod 42 and also to the support 38 and able to allow the roller 43 to keep the reinforcement thread 22 pressed against the covering layer 21 of the sailcloths 17, 18, 19 and 20.

The electric motors 39 of the individual positioning devices 37 are connected to the control unit 34 which, according to the geometry of the reinforcement structures 23 and 24 to be achieved, moves said devices 37 so as to suitably vary the distances between the reinforcement elements 22.

It is clear that modifications and/or additions of parts or steps may be made to the sail 10 and the method to produce it as described heretofore, without departing from the field and scope of the present invention.

For example, according to a variant, not shown here, the thread-laying head 33 of the apparatus 30 can dispose on the individual sailcloths 17, 18, 19 and 20 a single reinforcement thread 22, or reinforcement threads 22 of different material and different thickness.

It is also clear that, although the present invention has been described with reference to some specific examples, a person of skill in the art shall certainly be able to achieve many other equivalent forms of apparatus and method to make a sail and the relative sail thus made, having the characteristics as set forth in the claims and hence all coming within the field of protection defined thereby.

The invention claimed is:

1. A sail having at least three tops and three corresponding edges opposite said tops and comprising a plurality of panels each of which in turn comprises two outer covering layers, between which a plurality of reinforcement elements are positioned which define, in their entirety, a multi-directional main reinforcement structure, wherein said plurality of reinforcement elements are disposed in a pre-determined manner with respect to three generatrix lines, respectively first, second and third, which have in common a determinate reference point, disposed in a substantially central position of said sail, and each one passing through, or near, one of said three tops, and wherein said generatrix lines are divided into a same number n of intermediate points, through which said reinforcement elements pass.

2. A sail as in claim 1, wherein said plurality of reinforcement elements are divided into at least three groups, respectively first, second and third group.

3. A sail as in claim 2, wherein in said first group a first reinforcement element passes both through a first intermediate point of said first generatrix line and adjacent to said reference point, and also through the nth intermediate point of said second generatrix line farthest from said reference point.

4. A sail as in claim 2, wherein a second reinforcement element passes both through a second intermediate point of said first generatrix line, adjacent to said first intermediate point, and also through an intermediate point n−1 of said second generatrix line adjacent to said nth intermediate point and so on until an nth reinforcement element passes both through the nth intermediate point of said first generatrix line and also through a first intermediate point of said second generatrix line disposed adjacent to said reference point.

5. A sail as in claim 2, wherein in said second group a first reinforcement element passes both through said first intermediate point of said first generatrix line and also through the nth intermediate point of said third generatrix line farthest from said reference point.

6. A sail as in claim 2, wherein a second reinforcement element passes both through said second intermediate point of said first generatrix line and also through an intermediate point n−1 of said third generatrix line adjacent to said nth intermediate point of said third generatrix line and so on until an nth reinforcement element passes both through said nth intermediate point of said first generatrix line and also through a first intermediate point of said third generatrix line disposed adjacent to said reference point.

7. A sail as in claim 2, wherein in said third group a first reinforcement element passes both through said first intermediate point of said second generatrix line and also through said nth intermediate point of said third generatrix line, a second reinforcement element passes both through a second intermediate point of said second generatrix line adjacent to said first intermediate point of said second generatrix line, and also through said intermediate point n−1 of said third generatrix line and so on until a last reinforcement element passes both through said nth intermediate point of said second generatrix line and also through said first intermediate point of said third generatrix line.

8. A sail as in claim 2, wherein at least some of said reinforcement elements, of at least one of said three groups, are parallel to each other.

9. A sail as in claim 1, wherein said reference point coincides with a pressure center of said sail.

10. A sail as in claim 1, wherein said reinforcement elements intersect in twos at always different points, thus guaranteeing a minimum thickness for said sail in said points of intersection.

11. A sail as in claim 1, wherein said n intermediate points of said generatrix lines are comprised between said reference point and the corresponding of said tops through which each of said generatrix lines passes.

12. A sail as in claim 11, wherein said n intermediate points of said generatrix lines are disposed at the same distance from each other.

13. A sail as in claim 12, wherein a first auxiliary reinforcement structure is defined according to said reference point and to said three generatrix lines divided into a plurality of intermediate points connected with each other by means of said reinforcement elements.

14. A sail as in claim 13, wherein said n intermediate points of said generatrix lines in said first auxiliary reinforcement structure are also disposed on the extensions, with respect to said tops, of said generatrix lines.

15. A sail as in claim 14, wherein said first auxiliary reinforcement structure is defined according to a second reference point calculated for a force condition acting on said sail which is different from the force condition considered in order to determine said determinate reference point.

16. A sail as in claim 1, wherein said plurality of reinforcement elements also achieve at least a first multi-directional auxiliary reinforcement structure able to cooperate with said main reinforcement structure in order to give greater resistance to said sail.

17. A sail as in claim 16, wherein said plurality of reinforcement elements also achieve at least a second multi-directional auxiliary reinforcement structure able to cooperate with said main reinforcement structure and possibly also with said first auxiliary reinforcement structure in order to give greater resistance to said sail.

18. A sail as in claim 17, wherein said second auxiliary reinforcement structure is defined by three other generatrix lines, different from said three generatrix lines and having in common a determinate reference point, wherein two of said other three generatrix lines pass, in the case of a mainsail, through new tack points and clew points, or, in the case of a jib, through new tack points and head points, according to how the surface of the sail is reduced, and wherein reinforcement elements join intermediate points of said other three generatrix lines and intersect each other.

19. A sail as in claim 18, wherein reinforcement elements join points both of said main reinforcement structure, and also of said first auxiliary reinforcement structure, constructed on different tops with respect to the main structure.

20. An apparatus to make a sail as in claim 1, comprising disposition means able to dispose a plurality of said reinforcement elements on each of said panels, wherein said disposition means comprise a plurality of positioning devices able to vary continuously, upon command from control means, the distance between said reinforcement elements so as to achieve a multi-directional main reinforcement structure of said sail with a desired geometry.

21. A method to make a sail having three tops and three corresponding edges opposite said tops and comprising a plurality of panels each of which in turn comprises two outer covering layers, between which a plurality of reinforcement elements are positioned which define, in their entirety, a main reinforcement structure, wherein said method comprises in sequence the following steps:

a step of virtual definition of the geometry of said main reinforcement structure, by arranging said plurality of reinforcement elements in a predetermined manner with respect to three generatrix lines, respectively first, second and third which have in common a determinate reference point, disposed in a substantially central position of said sail, and each one passing through one of said three tops, a second step of depositing said reinforcement elements on each of said panels according to said geometry of said main reinforcement structure;

a third step of joining said panels together, in order to confer on said sail a determinate aerodynamic profile and in such a manner that said reinforcement elements, disposed between said covering layers of said panels achieve, in their entirety, said main reinforcement structure, wherein said virtual definition step comprises in sequence the following sub-steps:

a first sub-step of determining said reference point;

a second sub-step of plotting said three generatrix lines;

a third sub-step of virtual realization of the geometry of said main reinforcement structure, and wherein in said third sub-step of virtual definition, all three of said generatrix lines are divided into the same number n of intermediate points, suitably distanced from each other.

22. Method as in claim 21, wherein said virtual definition step also comprises a fourth sub-step of virtual realization of the geometry of an auxiliary reinforcement structure.

23. A method as in claim 21, wherein said reference point coincides with a pressure center of said sail and wherein in said first determination sub-step said pressure center is calculated according to a determinate state of stress to which said sail is subjected.

24. A method as in claim 23, wherein said intermediate points are connected by a plurality of curves.

25. A method as in claim 24, wherein said curves are geodetic curves.

26. A method as in claim 24, wherein said plurality of curves are divided into at least three groups, respectively first, second and third group.

27. A method as in claim 26, wherein in said first group a first curve passes both through a first intermediate point of said first generatrix line and adjacent to said reference point, and also through the nth intermediate point of said second generatrix line as far as possible from said reference point.

28. A method as in claim 26, wherein a second curve passes both through a second intermediate point of said first generatrix line adjacent to said first intermediate point, and also through an intermediate point n−1 of said second generatrix line adjacent to said nth intermediate point and so on until an nth curve passes both through the nth intermediate point of said first generatrix line and also through a first intermediate point of said second generatrix line disposed adjacent to said reference point.

29. A method as in claim 26, wherein in said second group a first curve passes both through said first intermediate point of said first generatrix line and also through the nth intermediate point of said third generatrix line farthest from said reference point.

30. A method as in claim 26, wherein a second curve passes both through said second intermediate point of said first generatrix line and also through an intermediate point n−1 of said third generatrix line adjacent to said nth intermediate point of said third generatrix line and so on until an nth curve passes both through said nth intermediate point of said first generatrix line and also through a first intermediate point of said third generatrix line disposed adjacent to said reference point.

31. A method as in claim 26, wherein in said third group a first curve passes both through said first intermediate point of said second generatrix line and also through said nth intermediate point of said third generatrix line, a second curve passes both through a second intermediate point of said second generatrix line adjacent to said first intermediate point of said second generatrix line, and also through said intermediate point n−1 of said third generatrix line and so on until an nth curve passes both through said nth intermediate point of said second generatrix line and also through said first intermediate point of said third generatrix line.

32. A method as in claim 21, wherein in a fourth sub-step of realization, an auxiliary reinforcement structure is made according to said reference point and said generatrix lines divided into a plurality of intermediate points connected with each other by means of said curves.

33. A method as in claim 21, wherein in said disposition step an apparatus disposes said reinforcement elements on said panels according to the geometry of said reinforcement structures, made by means of said curves.

* * * * *